United States Patent [19]

Makhija et al.

[11] Patent Number: 5,541,240
[45] Date of Patent: Jul. 30, 1996

[54] METHOD FOR MAKING BLENDS OF LIQUID CRYSTALLINE AND ISOTROPIC POLYMERS

[75] Inventors: Subhash Makhija, Westfield; George L. Lundberg, Long Valley; James B. Stamatoff, Westfield, all of N.J.

[73] Assignee: Hoechst Celanese Corp., Somerville, N.J.

[21] Appl. No.: 213,207

[22] Filed: Mar. 15, 1994

[51] Int. Cl.⁶ .................................................. C08L 67/00
[52] U.S. Cl. ........................ 523/351; 524/538; 524/539; 524/602; 525/132; 525/425; 525/436; 525/437; 525/439; 525/444; 525/448; 525/537
[58] Field of Search ........................ 523/348, 351; 525/132, 418, 425, 432, 436, 437, 439, 444, 448, 537; 524/494, 538, 539

[56] References Cited

U.S. PATENT DOCUMENTS

| | | | |
|---|---|---|---|
| 4,276,397 | 6/1981 | Froix | 525/448 |
| 4,330,457 | 5/1982 | East et al. | 524/602 |
| 4,386,174 | 5/1983 | Cogswell et al. | 524/27 |
| 4,451,611 | 5/1984 | Cincotta et al. | 524/539 |
| 4,460,735 | 7/1984 | Froix | 524/537 |
| 4,460,736 | 7/1984 | Froix et al. | 524/539 |
| 4,489,190 | 12/1984 | Froix | 524/539 |
| 4,547,541 | 10/1985 | Golba, Jr. | 524/141 |
| 4,565,850 | 1/1986 | Prevorsek et al. | 525/425 |
| 4,792,587 | 12/1988 | Kanoe et al. | 525/131 |
| 5,006,402 | 4/1991 | Isayev | 428/294 |
| 5,310,776 | 5/1994 | Takagi et al. | 525/132 |
| 5,324,795 | 6/1994 | Suenaga | 525/425 |

FOREIGN PATENT DOCUMENTS

| | | |
|---|---|---|
| 0340655 | 11/1989 | European Pat. Off. . |
| 0348800 | 1/1990 | European Pat. Off. . |
| 1348286 | 3/1974 | United Kingdom . |

OTHER PUBLICATIONS

A. I. Isayev, et al., "Thermoplastic Fiber–Reinforced Composites Based on Liquid Crystalline Polymer" from proceedings of the Third Annual Conference on Advanced Composites, pp. 259–267, Sep. 15–17, 1987, Detroit, MI.

*Primary Examiner*—Tae Yoon
*Attorney, Agent, or Firm*—James L. McGinnis

[57] ABSTRACT

Blends of thermotropic liquid crystalline polymers and isotropic melt-processable polymers are made by extruding a molten stream of either a thermotropic liquid crystalline polymer or an isotropic polymer through a heated mixing zone and feeding the other of the two polymers into the stream of the first polymer in the mixing zone. The polymers are mixed under shearing conditions for a time sufficient to yield a uniform blend. Blends made according to this method exhibit improved properties in comparison with blends obtained by feeding the two polymers simultaneously into a heated mixing zone.

23 Claims, No Drawings

METHOD FOR MAKING BLENDS OF LIQUID CRYSTALLINE AND ISOTROPIC POLYMERS

BACKGROUND OF THE INVENTION

In an effort to optimize polymer properties for specific applications at the lowest cost, polymers are often blended together. Numerous blends comprising thermotropic liquid crystalline polymers (LCP's) and isotropic polymers have been reported in the literature. These include blends of LCP's with polyethylene terephthalate (U.S. Pat. No. 4,489, 190), polyphenylene sulfide (U.S. Pat. No. 4,276,397), polycarbonate (U.S. Pat. No. 4,460,735), polysulfones (U.S. Pat. No. 4,460,736), and many other isotropic polymers (e.g., U.S. Pat. No. 4,386,174 and 4,792,587). These blends are generally made by mixing the polymers as solids, usually in the form of pellets, and feeding them together into an extruder, where they are melted and mixed together under shear to yield a uniform blend.

Generally these polymers are not miscible, and the blends are composed of individual domains of one polymer in the second polymer. The properties of the resulting blends typically are the weighted average of the properties of the individual components of the blend (i.e., they follow the rule of mixtures). More often, the properties of the blends are less than predicted by the rule of mixtures.

SUMMARY OF THE INVENTION

A method has been found for making a blend of a thermotropic liquid crystalline polymer and a melt-processable isotropic polymer with improved properties compared with a blend of the same polymers made by the conventional method of simultaneously feeding the two polymers into an extruder. In this method, a stream of either the thermotropic liquid crystalline polymer or the isotropic polymer is extruded in a molten state through a heated zone under conditions in which the polymer is sheared. The other polymer component of the blend is then introduced into the stream of molten polymer that is being extruded through the heated mixing zone, and the two polymers are mixed under shearing conditions for a time that is sufficient to yield a uniform blend.

DETAILED DESCRIPTION OF THE INVENTION

Preferably, the heated mixing zone is in an extruder comprising one or more screws rotating in a hollow barrel. The extruder is equipped with two ports for feeding the polymer into the barrel, with one polymer component being fed into each port. A first port for feeding polymer is generally at or near the beginning of the barrel, at the opposite end from the outlet, which is a heated die. The second port is downstream from the first port, preferably at a position between about ¼ to about ¾ of the length of the extruder from the feed port. Most preferably the second port is in about the middle of the length of the barrel of the extruder (about 40% to about 60% of the distance from the beginning of the extruder).

If filled blends are desired, glass fibers and other fillers may be included. Preferably the glass fiber is added through the second port to minimize breakage of the fibers due to excessive mixing. Generally, blending can be carried out in a single screw or twin screw extruder. A twin screw extruder is preferred because of its higher shear, resulting in better mixing.

Thermotropic liquid crystalline polymers that are utilized in making blends by the method described herein are well known in the art. The polymer chains are relatively rigid and linear, so that the polymers melt to form a liquid crystalline phase. Generally, the polymers useful in forming these blends melt to form liquid crystalline phases at temperatures less than about 400° C. These polymers are generally condensation polymers, including aromatic polyesters, aliphatic-aromatic polyesters, aromatic poly(esteramides), aliphatic-aromatic poly(esteramides), aromatic poly(esteramides), aromatic poly(estercarbonates), aromatic polyamides, and aliphaticaromatic polyamides. The preferred thermotropic liquid crystalline polymers are aromatic polyesters and poly(esteramides) which form liquid crystalline melt phases at temperatures less than about 350° C. and include one or more monomer units derived from terephthalic acid, isophthalic acid, 1,4-hydroquinone, resorcinol, 4,4'-dihydroxybiphenyl, 4,4'-biphenyldicarboxylic acid, 4-hydroxybenzoic acid, 6-hydroxy-2-naphthoic acid, 2,6-naphthalenedicarboxylic acid, 2,6-dihydroxynaphthalene, 4-aminophenol, and 4-aminobenzoic acid.

Some of the aromatic groups may include substituents which do not react under the conditions of the polymerization, such as lower alkyl groups having 1–4 carbons, aromatic groups, F, Cl, Br and I. The synthesis and structure of some typical aromatic polyesters are taught in U.S. Pat. Nos. 4,473,682; 4,522,974; 4,375,530; 4,318,841; 4,256,624; 4,161,470; 4,219,461; 4,083,829; 4,184,996; 4,279,803; 4,337,190; 4,355,134; 4,429,105; 4,393,191; and 4,421,908. The synthesis and structure of some typical aromatic poly(esteramides) are taught in U.S. Pat. Nos. 4,339,375; 4,355, 132; 4,351,917; 4,330,457; 4,351,918; and 5,204,443. Aromatic liquid crystalline polyesters and poly(esteramides) are available from Hoechst Celanese Corporation under the Vectra® trademark, as well as from other manufacturers.

A particularly preferred liquid crystalline polyester comprises monomer repeat units derived from 4-hydroxybenzoic acid and 6-hydroxy-2-naphthoic acid, as taught in U.S. Pat. No. 4,161,470. Preferably, monomer units derived from 4-hydroxybenzoic acid comprise about 15% to about 85% of the polymer on a mole basis and monomer units derived from 6-hydroxy-2-naphthoic acid comprise about 85% to about 15% of the polymer on a mole basis. Most preferably, the polymer comprises about 73% monomer units derived from 4-hydroxybenzoic acid and about 27% monomer units derived from 6-hydroxy-2-naphthoic acid, on a mole basis.

Other preferred liquid crystalline polyesters or poly(esteramides) comprise the above recited monomer units derived from 6-hydroxy-2-naphthoic acid and 4-hydroxybenzoic acid, as well as monomer units derived from one or more of the following monomers: 4,4'-dihydroxybiphenyl, terephthalic acid and 4-aminophenol. A preferred polyester comprising these monomer units is derived from 4-hydroxybenzoic acid, 6-hydroxy-2-naphthoic acid, 4,4'-biphenol and terephthalic acid, as taught in U.S. Pat. No. 4,473,682, with the polymer comprising these monomer units in a mole ratio of about 60:4:18:18 being particularly preferred.

A preferred poly(esteramide) comprises monomer units derived from 4-hydroxybenzoic acid, 6-hydroxy-2-naphthoic acid, terephthalic acid, 4,4'-biphenol and 4-aminophenol, as taught in U.S. Pat. No. 5,204,443; a highly preferred composition comprises these monomer units in a mole ratio of about 60:3.5:18.25:13.25:5.

Another liquid crystalline poly(esteramide) that can be utilized in this invention is the polymer derived from 6-hydroxy-2-naphthoic acid, terephthalic acid, and 4-aminophenol, preferably in a ratio of about 60:20:20. This poly(esteramide) is described in U.S. Pat. No. 4,330,457.

The liquid crystalline polymers that are utilized in making the blends taught herein generally have a weight average molecular weight ($M_w$) greater than about 5000 and preferably greater than about 10,000. The preferred LCP polyester comprising monomer units derived from about 73% 4-hydroxybenzoic acid and 27% 6-hydroxy-2-naphthoic acid preferably has a molecular weight ($M_w$) greater than about 20,000 and often in the range of about 30,000 to about 40,000. Molecular weights in the low end of the above range (i.e., $M_w$ starting as low as about 5,000) may also be utilized in the current invention. To achieve such low molecular weights, the addition of a small amount of an end-capping monomer unit or a slight imbalance in stoichiometry may be necessary. For example, a small amount of terephthalic acid may be included in polymers derived from 6-hydroxy-2-naphthoic acid and 4-hydroxybenzoic acid to reduce the molecular weight.

The isotropic polymers utilized in making blends by the method disclosed herein are also well known in the art. These polymers are melt processable, melting to form isotropic molten phases. They melt at temperatures of less than or about 350° C. They can be semicrystalline or amorphous. Semicrystalline isotropic polymers that may be used in this invention include poly(alkylene terephthalate)s, poly(alkylene naphthalate)s, such as poly(ethylene naphthalate), poly(arylene sulfide)s, aliphatic polyamides, aliphatic-aromatic polyamides, and polyesters comprising monomer units derived from 1,4-cyclohexanedimethanol and terephthalic acid. The preferred semicrystalline isotropic polymers include poly(ethylene terephthalate), poly(butylene terephthalate), and poly(phenylene sulfide). The most preferred isotropic polymer is poly(ethylene terephthalate). Amorphous polymers that can be used include polycarbonates and polyarylates, wherein the polyarylates are derived from bisphenol A, terephthalic acid and isophthalic acid.

As stated previously, the blends are preferably made in a twin screw extruder having two ports for feeding polymers and other materials. One of the polymers (i.e., either a thermotropic liquid crystalline polymer or an isotropic polymer) is fed through the first port near the beginning of the barrel of the extruder. The other of the two polymers is fed through the downstream port, which is preferably approximately in the middle of the extruder. Preferably the isotropic polymers is fed through the first port and the thermotropic liquid crystalline polymer is fed through the downstream port.

Blends of poly(ethylene terephthalate) and a liquid crystalline polymer are highly preferred. Their properties show the greatest improvement when the poly(ethylene terephthalate) is fed into the extruder first and the liquid crystalline polymer is fed into the stream of poly(ethylene terephthalate) through a second port. In this case, the liquid crystalline polymer preferably comprises monomer units derived from about 15% to about 85% on a mole basis of 4-hydroxybenzoic acid and about 85% to about 15% on a mole basis of 6-hydroxy-2-naphthoic acid, and most preferably comprises about 73 mole % of monomer units derived from 4-hydroxybenzoic acid and about 27 mole % of monomer units derived from 6-hydroxy-2-naphthoic acid.

Blends made by the above method generally exhibit an improvement in one or more of the following physical properties: tensile strength, measured according to ASTM method D-638; tensile modulus, measured according to ASTM method D-638; or Notched Izod impact strength, measured according to ASTM method D-256, when compared with a blend of the same polymers made by the conventional method of melt blending, where the two polymers are introduced simultaneously into the mixing zone. Preferably, the improvement in one of these physical properties is by an amount of at least about 10%.

Additives may also be included in the blends made by this method. Examples of such additives include reinforcing fibers, mineral fillers, nucleating agents, mold release agents, colorants, antioxidants, stabilizers, and lubricants. These can be fed into the extruder with either polymer. A preferred additive is glass fiber, which is generally fed into the extruder through the second port along with the second polymer.

EXAMPLE 1

A series of unfilled blends of a liquid crystalline polymer (LCP) and polyethylene terephthalate (PET) was made by conventional melt blending and by the sequential feed method. The PET was obtained from Hoechst Celanese Corp., Somerville, N.J., and had an intrinsic viscosity of 0.95 when measured at 25° C. in o-chlorophenol. The LCP was a polyester containing about 73% of 4-oxybenzoyl monomer units and about 27% of 6-oxy-2-naphthoyl monomer units. Filled forms of this polymer are available from Hoechst Celanese Corp. under the Vectra® trademark as the A series of resins. The polymer can be synthesized by the methods taught in U.S. Pat. Nos. 4,161,470 and 4,429,105. The LCP resin exhibited a melting point by differential scanning calorimetry (DSC) of 282° C., and the PET melted at 252° C. by DSC analysis. Both polymers were dried for at least 12 hours at 130° C. in a convection oven prior to blending.

The blending experiments were carried out in a 30 mm ZSK twin screw extruder manufactured by Werner Pfleiderer Corp. The screw length was about 890 mm long. The barrel in which the screws turned contained two ports. The first port was at the beginning of the extruder. The second was about in the middle of the extruder (about 40–50% of the distance from the beginning to the exit). There was also a vent to which vacuum could be applied near the exit end of the barrel. The polymer was extruded through a die at the end of the barrel. For convenience, the port at the beginning of the barrel is referred to as Port No. 1, and the port near the middle of the barrel is referred to as Port No. 2. The barrel was heated by 5 heaters in sequence, so that there were 5 heated zones, with the first heated zone being near Port No. 1, the third heated zone being near Port No. 2, and the fifth heated zone being near the vent. The die was also heated. The blending conditions for the three polymer blends that were made are shown in Table 1.

For purposes of comparison, blends of LCP: PET in weight ratios of 70:30, 50:50 and 15:85 were made by two methods, the conventional method (simultaneous feed) and sequential feed, which are described below.

Conventional. A mixture of dried pellets of LCP and PET in the desired ratio was placed into a feed hopper above Port No. 1. These were fed into the extruder. The feed rate of polymer pellets was controlled to maintain a rate of production of the blend of about 30 lbs/hr. The polymer melt was cooled in water as it exited from the extruder and was pelletized on line.

Sequential Feed. The extruder was set up with feed hoppers above both Port No. 1 and Port No. 2. One of the polymers (in the form of dried pellets) was fed into Port No. 1 at the beginning of the shaft, and the other (also dried pellets) was fed at Port No. 2, somewhat before the middle of the shaft. At the beginning of the experiment, the polymer at Port No. 1 was fed first, and once conditions stabilized, the other polymer was fed into Port No. 2. The feed rates of the two polymers were controlled to give blends of LCP:PET of 70:30, 50:50, and 15:85. Separate batches were made in which (1) PET was fed at Port No. 1 and LCP at Port No. 2, so that LCP was fed into a stream of molten PET as it was being extruded, and (2) LCP was fed at Port No. 1 and PET at Port No. 2, so that PET was fed into a stream of molten LCP. These are referred to respectively as "PET First" and "LCP First" in Table 3. The compositions of the blends were confirmed by extracting PET from samples of the blends with hexafluoroisopropanol and weighing the undissolved LCP polymer. Physical Testing. The pelletized blends described above were injection molded into test bars required for testing of tensile properties, notched Izod impact strength, and heat distortion temperature according to ASTM test methods. The molding conditions for the three polymer blend compositions are shown in Table 2.

The physical properties were then measured according to standard test methods. These are shown in Table 3. The tensile modulus, tensile strength and elongation were measured using ASTM D-638. The Notched Izod impact strength was measured using ASTM D-256. The heat distortion temperature (distortion temperature under load) at 264 psi was measured by ASTM D-648. It can be seen in Table 3 that the tensile properties and notched Izod impact strength measurements are usually higher for the blends made by sequential feeding than for the same blends made by simultaneous feeding.

EXAMPLE 2

Glass filled compounds of LCP and PET were made using the sequential feed method described in Example 1, with the PET being fed first and the LCP and glass fiber being fed into the molten PET stream. A 30 mm ZSK twin screw extruder with two ports for feeding was again used. Dried PET pellets were fed into Port No. 1, at the beginning of the shaft, through a feed hopper. A mixture of glass fiber and dried LCP pellets was introduced into Port No. 2, at about the middle of the barrel, through a feed hopper. The glass fiber was included in an amount that would give a 30% glass-filled blend. As in Example 1, the PET feed was started first. Once that stabilized, the feed of LCP/glass fiber was started and gradually increased until the desired ratio was obtained. Blends of 70:30 and 50:50 LCP:PET filled with 30% glass fiber were made by this method. These were then injection molded under the same conditions as in Example 1 to produce test specimens for measuring physical properties. Tensile properties (modulus, strength and elongation), the Notched Izod impact strength, and heat distortion temperature at 264 psi were measured by the same test methods as in Example 1. These data are presented in Table 4.

It is to be understood that the above described embodiments of the invention are illustrative only and that modification throughout may occur to one skilled in the art. Accordingly, this invention is not to be regarded as limited to the embodiments disclosed herein.

TABLE 1

Blending Conditions

| | LCP/PET Ratio | | |
|---|---|---|---|
| | 70/30 | 50/50 | 15/85 |
| Zone 1 Temperature (°F.) | 542 | 541 | 543 |
| Zone 2 Temperature (°F.) | 540 | 553 | 579 |
| Zone 3 Temperature (°F.) | 562 | 570 | 577 |
| Zone 4 Temperature (°F.) | 562 | 562 | 565 |
| Zone 5 Temperature (°F.) | 560 | 564 | 572 |
| Die Temperature (°F.) | 562 | 561 | 567 |
| Melt Temperature (°F.) | 600 | 602 | 589 |
| Screw RPM | 175 | 175 | 200 |

TABLE 2

Injection Molding Conditions

| | LCP/PET Ratio | | |
|---|---|---|---|
| | 70/30 | 50/50 | 15/85 |
| Temperature, Rear (°F.) | 545 | 570 | 555 |
| Temperature, Middle (°F.) | 545 | 570 | 555 |
| Temperature, Front (°F.) | 545 | 570 | 555 |
| Nozzle Temperature (°F.) | 550 | 575 | 565 |
| Mold Temperature (°F.) | 170 | 125 | 200 |
| Cycle Time, High Injecter Pressure (Sec.) | 3 | 3 | 3 |
| Cycle Time, Low Injector Pressure (Sec.) | 15 | 15 | 15 |
| Cooling (Sec.) | 20 | 20 | 20 |
| Total Cycle Time (Sec.) | 38 | 38 | 38 |
| High Injector Pressure (psi) | 9200 | 9700 | 12,300 |
| Low Injector Pressure (psi) | 8700 | 8500 | 12,000 |
| Screw RPM | 95 | 95 | 95 |

TABLE 3

Properties of LCP/PET Blends

| Order of Feed | LCP/PET | Tensile Modulus (Mpsi) | Tensile Strength (kpsi) | Elongation (%) | Notched Izod (ft-lb./in.) | HDT at 264 psi |
|---|---|---|---|---|---|---|
| — | 0/100 | 0.33 | 4.08 | 216 | 0.57 | 67° C. |
| Simultaneous | 15/85 | 0.36 | 8.3 | 3.6 | 0.51 | — |
| PET first | 15/85 | 0.47 | 9.8 | 3.5 | 0.52 | 69° C. |

TABLE 3-continued

Properties of LCP/PET Blends

| Order of Feed | LCP/PET | Tensile Modulus (Mpsi) | Tensile Strength (kpsi) | Elongation (%) | Notched Izod (ft-lb./in.) | HDT at 264 psi |
|---|---|---|---|---|---|---|
| LCP first | 15/85 | 0.46 | 10.4 | 3.3 | 0.58 | — |
| Simultaneous | 50/50 | 0.96 | 16.5 | 2.6 | 0.87 | — |
| PET first | 50/50 | 1.39 | 22.9 | 2.3 | 2.37 | 83° C. |
| LCP first | 50/50 | 0.84 | 12.9 | 1.9 | 0.76 | — |
| Simultaneous | 70/30 | 1.26 | 15.2 | 1.6 | 1.68 | — |
| PET first | 70/30 | 1.62 | 23.5 | 2.0 | 6.84 | 156° C. |
| LCP first | 70/30 | 1.42 | 20.3 | 2.0 | 5.88 | — |
| — | 100/0 | 1.69 | 28.9 | 3.7 | 10 | 180° C. |

TABLE 4

Properties of 30% Glass-filled LCP/PET Blends

| | LCP/PET[1] | | |
|---|---|---|---|
| | 50/50[2] | 70/30[2] | 100/0 |
| Tensile Modulus (Mpsi) | 2.13 | 2.18 | 2.4 |
| Tensile Strength (kpsi) | 27.7 | 20.5 | 30 |
| Elongation (%) | 1.82 | 1.24 | 2.2 |
| Notched Izod (ft.-lb/in.) | 2.99 | 4.32 | 2.8 |
| HDT at 264 psi | 219° C. | 225° C. | 230° C. |

[1]Composition by weight of polymer blend. Also includes 30% glass fiber.
[2]Blends were made by introducing LCP and glass fiber downstream from PET in a twin screw extruder.

We claim:

1. A method of making a blend which comprises a thermotropic liquid crystalline polymer and a melt-processable isotropic polymer, comprising the steps of:
   (a) extruding a stream of a first polymer in the molten state through a heated mixing zone under shearing conditions;
   (b) feeding a second polymer in the solid state into the stream of said first polymer in said mixing zone, wherein said mixing zone is at a temperature sufficient to melt said second polymer; and
   (c) mixing said first polymer and said second polymer under shearing conditions for a time sufficient to yield a uniform blend;
   wherein one of said first polymer and said second polymer is a thermotropic liquid crystalline polymer and the other of said first polymer and said second polymer is a melt-processable isotropic polymer.

2. The method as recited in claim 1, wherein said heated mixing zone is in an extruder comprising one or more screws rotating in a hollow barrel, said first polymer being fed into a first port and said second polymer being fed into a second port along said barrel, wherein said first port is upstream of said second port with respect to the direction of polymer flow.

3. The method as recited in claim 2, wherein said first port is placed approximately at the beginning of said barrel so that said first polymer is extruded approximately the length of said barrel, and
   said second port is placed at a position between about ¼ and about ¾ of the distance from the beginning to the end of said barrel.

4. The method as recited in claim 3, wherein said extruder is a twin screw extruder.

5. The method as recited in claim 1, wherein said thermotropic liquid crystalline polymer melts at less than abut 400° C. and is selected from the group consisting of aromatic polyesters, aliphatic-aromatic polyesters, aromatic poly(esteramides), aliphatic-aromatic poly(esteramides), aromatic poly(esteramides), aromatic poly(estercarbonates), aromatic polyamides, and aliphatic-aromatic polyamides.

6. The method as recited in claim 1, wherein said thermotropic liquid crystalline polymer melts at less than about 350° C. and is an aromatic polyester or poly(esteramide) comprising at least one monomer unit derived from a monomer selected from the group consisting of terephthalic acid, isophthalic acid, 1,4-hydroquinone, resorcinol, 4,4'-dihydroxybiphenyl, 4,4'-biphenyldicarboxylic acid, 4-hydroxybenzoic acid, 6-hydroxy-2-naphthoic acid, 2-6-naphthalenedicarboxylic acid, 2,6-dihydroxynaphthalene, and 4-aminophenol.

7. The method as recited in claim 6, wherein said aromatic polyester or poly(esteramide) comprises monomer units derived from 6-hydroxy-2-naphthoic acid and 4-hydroxybenzoic acid, and optionally also comprises one or more monomer units derived from the group of monomers consisting of 4,4'-dihydroxybiphenyl, terephthalic acid, and 4-aminophenol.

8. The method as recited in claim 1, wherein said thermotropic liquid crystalline polymer is a poly(esteramide) comprising monomer units derived from 6-hydroxy-2-naphthoic acid, terephthalic acid and 4-aminophenol.

9. The method as recited in claim 1, wherein said isotropic polymer is a semicrystalline polymer having a melting temperature less than about 350° C. and is selected from the group consisting of poly(alkylene terephthalate)s, poly(alkylene naphthalate)s, poly(arylene sulfide)s, aliphatic polyamides, aliphatic-aromatic polyamides, and polyesters of 1,4-cyclohexanedimethanol and terephthalic acid.

10. The method as recited in claim 9, wherein said isotropic polymer is selected from the group consisting of poly(ethylene terephthalate), poly(butylene terephthalate), and poly(phenylene sulfide).

11. The method as recited in claim 1, wherein said isotropic polymer is an amorphous polymer having a melting temperature less than about 350° C. and is selected from the group consisting of polycarbonates and polyarylates.

12. The method as recited in claim 2, wherein said first polymer is said isotropic polymer and said second polymer is said liquid crystalline polymer.

13. The method as recited in claim 12, wherein said uniform blend shows an increase of at least about 10% in one physical property selected from the group consisting of tensile strength, measured according to ASTM D-638, tensile modulus, measured according to ASTM D-638, and notched Izod impact strength, measured according to ASTM D-256, in comparison with a blend of the same relative amounts of said liquid crystalline polymer and said isotropic polymer made according to the conventional melt blending method, wherein said liquid crystalline polymer and said isotropic polymer are introduced simultaneously into said mixing zone.

14. The method as recited in claim 1, wherein one or more additives selected from the group consisting of reinforcing fibers, mineral fillers, nucleating agents, mold release agents, colorants, antioxidants, stabilizers and lubricants are fed into said mixing zone with one or both of said first polymer and said second polymer.

15. A method of making a blend comprising a thermotropic liquid crystalline polymer and a melt-processable isotropic polymer, comprising the steps of:
 (a) feeding a first polymer through a first port into an extruder comprising at least one rotating screw in a hollow barrel;
 (b) feeding a second polymer into said extruder through a second port downstream from said first port with respect to the direction of polymer flow; and
 (c) mixing said first and second polymer in said extruder for a time sufficient to yield a uniform blend; wherein one of said first polymer and said second polymer is a thermotropic liquid crystalline polymer and the other of said first polymer and said second polymer is a melt-processable isotropic polymer, wherein said first and second polymers are fed into said first and second ports of said extruder in the solid state; and wherein the temperature of said extruder is high enough to melt said first and second polymers.

16. The method as recited in claim 15, wherein said isotropic polymer is a semicrystalline polymer selected from the group consisting of poly(ethylene terephthalate), poly(butylene terephthalate), and poly(phenylene sulfide); and said liquid crystalline polymer is an aromatic polyester or aromatic poly(esteramide) comprising monomer units derived from 6-hydroxy-2-naphthoic acid and 4-hydroxybenzoic acid, optionally also comprising one or more monomer units derived from the group of monomers consisting of 4,4'-dihydroxybiphenyl, terephthalic acid, and 4-aminophenol.

17. The method as recited in claim 16, wherein said isotropic polymer is said first polymer and said thermotropic liquid crystalline polymer is said second polymer.

18. The method as recited in claim 17, wherein said first polymer is poly(ethylene terephthalate) and said second polymer is a thermotropic liquid crystalline polyester comprising monomer units derived from about 15% to about 85% on a mole basis of 4-hydroxybenzoic acid and about 85% to about 15% on a mole basis of 6-hydroxy-2-naphthoic acid.

19. The method as recited in claim 18, wherein said thermotropic liquid crystalline polyester comprises monomer units derived from about 73% on a mole basis of 4-hydroxybenzoic acid and about 27% on a mole basis of 6-hydroxy-2naphthoic acid,
 wherein said uniform blend shows an increase of at least about 10% in one property selected from the group consisting of tensile strength, measured according to ASTM D-638, tensile modulus, measured according to ASTM D-638 and Notched Izod impact strength, measured according to ASTM D-256, in comparison with a blend of the same relative amounts of said poly(ethylene terephthalate) and said liquid crystalline polymer made by the conventional method, said conventional method comprising the simultaneous introduction of said poly(ethylene terephthalate) and said liquid crystalline polymer into said extruder.

20. The method as recited in claim 16, wherein said extruder is a twin screw extruder, wherein said first port is approximately at the beginning of said barrel of said extruder, and said second port is approximately in the middle of said barrel of said extruder.

21. The method as recited in claim 18, wherein said uniform blend further comprises glass fiber, said glass fiber being fed into said extruder with said liquid crystalline polymer through said second port, wherein said extruder is a twin screw extruder.

22. The method as recited in claim 2, wherein said first and second polymers are introduced in the form of pellets into said first and second ports through feed hoppers.

23. The method as recited in claim 22, wherein said first polymer is said isotropic polymer and said second polymer is said liquid crystalline polymer.

* * * * *